Patented June 22, 1943

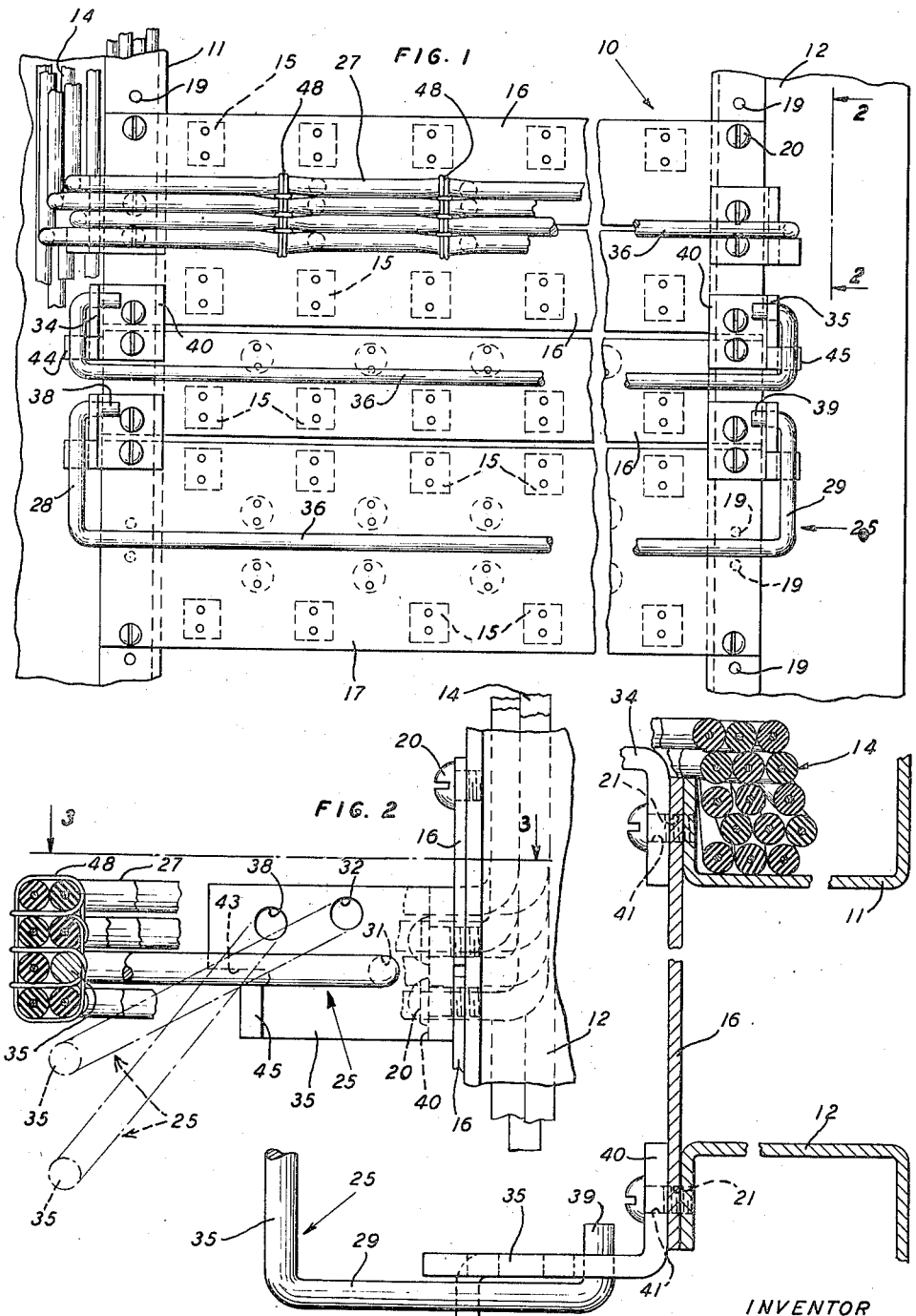

2,322,666

UNITED STATES PATENT OFFICE 2,322,666

CABLE SUPPORT

Herman J. Schmitz, Westfield, N. J., assignor to Western Electric Company, Incorporated, New York, N. Y., a corporation of New York Application August 31, 1940, Serial No. 354,928

6 Claims. (Cl. 248—68)

This invention relates to cable supports, and more particularly to supports for cable arms in telephone equipment.

Equipment for telephone exchanges includes frames with upright members drilled and tapped at uniform intervals to receive screws for mounting plates upon which various electrical units and other pieces of apparatus are mounted. The uprights are of the channel type for housing the wires of the main cable, but the cable arms including the wires which serve the electrical units are located horizontally at positions spaced from the plates upon which the units are mounted. It has been found advantageous to support these cable arms against interference with access to the units and possible weakening or breaking of their electrical connections, but due to the existing fact that there are single and double mounting plates and some cable arms can serve two single mounting plates, whereas others can only serve one, a support adaptable for mounting by the screws of the mounting plates and supporting the cable arms in the various positions was necessary.

An object of the invention is to provide a simple, efficient and accurately variable support for cables serving electrical units.

With this and other objects in view, the invention comprises a support for use in combination with mounting plates for electrical units, with means to accurately position the support at various definite locations and maintain it like distances from the mounting plates.

Other objects and advantages will be apparent from the following detailed description when considered in conjunction with the accompanying drawing, wherein Fig. 1 is a fragmentary rear elevational view of a portion of a frame illustrating the various conditions and various positions in which the support may be used;

Fig. 2 is an enlarged fragmentary detailed view taken substantially along the line 2—2 of Fig. 1, and Fig. 3 is a fragmentary sectional view taken along the line 3—3 of Fig. 2.

Referring now to the drawing, attention is directed to Fig. 1, which illustrates a portion of a frame indicated generally at 10 and including uprights 11 and 12. The uprights are of the channel type, as illustrated in Fig. 2, and when disposed adjacent other uprights they serve to house wires or insulated electrical conductors of a main cable 14. The wires of the main cable extend vertically either upwardly or downwardly in either upright and may be served to electrical units either from the left or the right. The various electrical units, indicated at 15, may be mounted upon either a single mounting plate 16 or a double mounting plate or panel 17. In the present illustration three single mounting plates 16 and one double mounting plate 17 are shown. The uprights, however, are provided with tapped openings 19 in pairs at definite spaced positions to receive mounting screws 20. The mounting plates 16 have apertures 21 in each end thereof, positioned to register with the tapped openings 19 as illustrated in Fig. 1. The apertures 21 may be elongated, if desired, for vertical adjustment of the mounting plates. The mounting plate 17 is also provided with apertures similar to the apertures 21 but spaced to register with tapped openings of alternate pairs as illustrated in Fig. 1. In this manner either a single or a double mounting plate may be mounted upon the uprights, depending upon the electrical units to be disposed at the definite portion of the equipment requiring a single or a double mounting plate.

The description thus far relates to the structures with which the support is to be associated. The support includes an element, indicated generally at 25, formed of suitable material such as metal rod having sufficient rigidity to support considerable weight, that is, the weight of the wires of a cable or cable arm, illustrated at 27, yet being sufficiently resilient so that its arms 28 and 29 may be sprung outwardly to connect the element in any desired locating aperture 31, 32 or 33 of supporting brackets 34 and 35. It will be observed that the element has a main supporting portion 36 disposed between the arms 28 and 29 and it is this portion which must be accurately located to support cable arms for the electrical units of the various mounting plates. The opposite ends of the arms 28 and 29 have inwardly bent projections 38 and 39, respectively, which are receivable in any of the apertures 31, 32 or 33 of their respective brackets 34 and 35, the projection 38 being slightly longer than the projection 39 to assure the element against disengagement with the supporting brackets.

The brackets 34 and 35 are substantially identical in construction excepting that they are of left and right hand formation. For example, they each have base portions 40 with pairs of apertures 41 therein spaced to register with any of the pairs of tapped openings 19, so that the screws 20 for the mounting plates may be employed also to mount the brackets 34 and 35 in place as illustrated. From the outer extremities of the bases 40 of the brackets portions extend at right angles and it is in these portions of the brackets that the apertures 31, 32 and 33 are disposed. Grooves 43 are formed and portions adjacent thereto and indicated at 44 and 45, respectively, are bent outwardly to form locating supports for the arms 28 and 29 of the element 25.

To illustrate the various purposes of the support, attention is first directed to the upper portion of Fig. 1 and to the solid line showing of the element 25 in Fig. 2. In this instance the projections 38 and 39 are located in the apertures 31 of their respective brackets and the arms rest in a truly horizontal position upon projections 44 and 45. The main or supporting portion 36 of the element is thus located midway between the two single mounting plates and at a specified distance therefrom. The wires of the main cable 14, which are to serve the electrical units 15 of these mounting plates, are then positioned relative to the element 25 and suitably connected to their respective units. After this has been accomplished the wires in the cable arm are stitched, as at 48, at spaced positions preferably adjacent the points where the wires extend into the units, these stitches including the portion 36 of the element as illustrated in Fig. 2. With the wires of the cable arm thus secured to the element, these wires will be held against displacement and supported by the element.

In the next illustration attention is directed to the middle of the three supports which has its brackets mounted at the juncture of the second and third single mounting plates. In this illustration the element 25 is located to support wires of the cable arm which are to serve electrical units 15 on the adjacent single mounting plate. The projections 38 and 39 are, therefore, located in the apertures 32 of the brackets. It is important that the portion 36 of the element be located a specified distance from the mounting plate and yet be located to satisfactorily support the wires from the main cable which are to serve the electrical units of this mounting plate. It will be observed by viewing Fig. 2, that the dotted line illustration of the element when mounted in the apertures 32 of the brackets will have its portion 36 in a plane extending through the location of this portion when the element is associated with the apertures 31. The wires for the electrical units of this mounting plate may then be located relative to the portion 36, directed to and connected to their respective electrical units, and stitched together and to the portion 36 in a manner similar to that illustrated in the upper portion of Figs. 1 and 2.

For the third illustration, attention is directed to the lower portion of Fig. 1, where the element 25 is mounted with its projections 38 and 39 in the apertures 33 of their respective brackets, the arms 28 and 29 resting upon their respective projections 44 and 45 to locate the portion 36 the specified distance from the double mounting plate 17 and adjacent the center thereof. In this manner the portion 36 of the element may receive and support the wires serving the electrical units mounted upon the mounting plate 17.

The element 25 may be either connected at the desired location with its brackets 34 and 35 when they are mounted, or the brackets may be mounted first and then by locating the projection 38 in the desired aperture 31, 32 or 33 of its bracket 34, the element may be flexed to allow insertion of the projection 39 in the correct aperture of its bracket 35.

It will be apparent that the support with its brackets and element may be readily mounted above the mounting plate which it is to serve, or between two mounting plates, and may be readily adjusted to locate the portion 36 of the element at various positions with respect to the mounting plates and the electrical units thereon, maintaining the specified definite distance (Fig. 2) from the mounting plates regardless of the location it assumes, to support cable arms including wires serving the various electrical units. The term "cable" is intended to include in its scope single wire cables, multiple wire cables and cables or cable arms formed of a plurality of single wire cables or a plurality of wire from the multiple wire cable.

The embodiment of the invention herein disclosed is merely illustrative and may be widely modified and departed from in many ways without departing from the spirit and scope of the invention as pointed out in and limited solely by the appended claims.

What is claimed is:

1. A support for a cable comprising an elongate element having arm portions, and spaced brackets mounted upon a frame and having rest portions for the arms and means to locate the arms in any one of various angular positions on the rest portions.

2. A support for a cable comprising an elongate element having arm portions, and spaced brackets mounted upon a frame and having rest portions for the arms and means to locate the arms in any one of various angular positions on the rest portions to singly locate the element in any one of various positions relative to yet equidistant from the frame.

3. A support for a cable comprising an elongate element having arm portions with transversely projecting ends, and spaced brackets mounted upon a frame and having rest portions for the arms and apertures to removably receive the projecting ends positioned to singly locate the arms in various angular positions to locate the element in any one of various positions relative to the frame yet equidistant therefrom.

4. A support for a cable comprising an elongate element having spaced arm portions projecting angularly therefrom, and spaced angle brackets each having a base portion mounted upon a frame, an integral laterally bent rest portion for its respective arm portion and portions to locate the respective arms at any of various angular positions on their respective rest portions to locate the element singly in various positions all being the same distance from the frame.

5. A support for a cable comprising an elongate element having spaced arm portions projecting angularly therefrom with engaging projections at their free ends, and spaced angle brackets each having a base portion mounted upon a frame, an integral laterally bent rest portion for its respective arm portion and openings to receive the projections to locate their respective arms at any of various angular positions on their respective rest portions to locate the element singly in various positions all being the same distance from the frame.

6. A support for cable arms formed of wires serving electrical units on mounting plates, the support comprising an element having an elongate supporting portion, and means to support the element to locate the supporting portion thereof in one of a plurality of positions parallel with and equidistant from the mounting plates to support a cable arm including wires extending longitudinally of the elements to points adjacent their respective electrical units.

HERMAN J. SCHMITZ.